Feb. 19, 1974 A. E. KAWKINS ET AL 3,793,466
PROCESS FOR PREPARING A RESTRUCTURED MEAT PRODUCT
Filed June 11, 1971 4 Sheets-Sheet 4

INVENTORS:
ARTHUR ERNEST HAWKINS
JEREMY REGINALD EVANS

BY his ATTORNEY 3,793,466
PROCESS FOR PREPARING A RESTRUCTURED MEAT PRODUCT
Arthur Ernest Hawkins, Bedford, and Jeremy Reginald Evans, Wollaston, England, assignors to Lever Brothers Company, New York, N.Y.
Filed June 11, 1971, Ser. No. 152,311
Int. Cl. A22c 18/00
U.S. Cl. 426—274                                        1 Claim

ABSTRACT OF THE DISCLOSURE

Meat of low quality is restructured by converting it to a fibrous comminute and extruding the comminute under shearing conditions as multiple streams concurrently with other edible material. The extrudate formed by concurrent extrusion, which comprises meat comminute streams distributed in a matrix of the edible material, is laterally compacted to form a coherent product. In the cooked state, the matrix-forming material simulates the appearance of the connective tissue, and optionally the fat as well, of cooked natural meat.

---

This invention relates to restructured meat products.

Much of the musculature of a meat carcass is, though nutritionally good, associated with so much tough connective tissue that it makes poor eating. If the natural structure producing this unsatisfactory eating texture is destroyed by finely comminuting the meat with conventional equipment such as a colloid mill, hammer mill or bowl chopper, the comminute produced can be restructured into products which on cooking are much more palatable and tender than the original meat is when cooked. However, such products hardly look like natural meat when cooked; their cut surface has too uniform an appearance.

The present invention provides a process for preparing restructured meat products which enables a much closer approximation to be made to the appearance that natural meat has when cooked.

In the process of the invention, a comminute of meat is extruded as multiple streams concurrently with other edible material that form a matrix in which the meat comminute streams are distributed, extrusion being carried out under conditions of shear such as to align at least some of the fibrous elements of the comminute in the direction of extrusion; and the extrudate is laterally compacted.

The properties required of the extrudable edible matrix-forming material are that it should be noticeably different in color from the fibrous meat comminute after cooking, so as to be capable of simulating the appearance of connective tissue, and if desired of fatty tissue as well, in the cooked compacted extrudate, and that it should be retained in the extrudate on cooking. One suitable basis for the matrix material is a flour, for example wheat flour; another is finely milled (non-fibrous) raw meat e.g. beef or chicken. The matrix material may include agents to modify its adhesive and cohesive properties, and its color and water-binding and comminute-binding properties in the cooked extrudate. Such agents as are used must of course be edible e.g. wheat gluten, methyl cellulose, heat-setting egg albumen.

By adjustment of the proportions and disposition of the meat comminute streams relative to the flow of the matrix material, the extruded matrix material can be made to simulate the appearance of the connective tissue and fatty tissue of natural meat, particularly beef, pork and lamb. For example, from a comminute of low quality beef such as forequarter, there can be obtained restructured meat which on cooking has a good eating texture and looks when sliced rather like topside or sirloin. Moreover, as with slices cut from a joint of natural meat, any given slice closely resembles the next.

As already indicated, extrusion is carried out so that the fibres in the meat comminute become generally aligned in the direction of extrusion, and this alignment of fibre is important in achieving a chewy eating texture. The fiber present in the comminute need not be (though it preferably is) that of the type of meat subjected to comminution, and need not be of meat at all, though it is preferably of protein. Thus, if a comminute of meat is made by using a bowl chopper with the blade/bowl clearance set very fine, so that the inherent fibrous structure of the meat is practically completely destroyed, the resulting comminute can be given a suitable fibrosity by including in it the fibre of cooked meats or spun protein fibres, for example fibres of acid-coagulated soy protein or of the heat-coagulated soy or groundnut protein composition described in Dutch patent specification 6912222. Added fibre is preferably included in an amount forming from about 5 to about 20% by weight of the comminute.

To bring about alignment of the fibrous elements of the meat comminute, the comminute is passed through tubes of diameter in the range of about 2 to about 20 mm. The tubes are not necessarily of circular section; they may for example be of hexagonal section, and may even be of wholly irregular section. The pressure required for the fibre alignment operation will depend on many factors, including the fineness of the comminute, but will usually be in the range 10–100 p.s.i. (=0.7–7.0 kg./cm.$^2$).

The matrix material extruded concurrently with the meat comminute is preferably extruded in the form of annular streams surrounding the streams of meat comminute. The extent to which the non-uniform appearance of the surface of cut natural meat can be simulated is increased by disposing the outlets of the meat comminute flow tubes in an irregular pattern, and making them of different diameters. The extent of simulation can also be increased by taking the extrudate of meat comminute streams distributed in matrix material, and, before lateral compaction of it, passing it through a number of tubes which are generally parallel to one another and are at their outlets radially distorted and packed close together. Such tubes are suitably of resilient plastics material.

Lateral compaction of the extrudate is preferably brought about by passing it through a tapered tube or nozzle, which imparts cohesiveness to the extrudes by a combination of adequate length and taper. The end of the nozzle may be of regular cross section (e.g. rectangular or circular), but if it is formed with an irregular periphery, or is made of flexible material and is during the extrusion process subjected to periodic distortion by a moving cam or the like, the compacted extrudate will when cut have an irregular outline resembling that of slices cut from a joint of natural meat. If desired, a layer of fat can be applied to the compacted extrudate to surround it partly or wholly.

The compacted extrudate can be frozen or chilled, for sale for example as thick slices to be cooked by grilling. Alternatively it can be heat-set, suitably by heating until a center temperature of at least 60° C. is attained. Such heat-set material is specially suitable for sale in the form of thin slices in gravy, to be reheated before serving. To produce an end-product of the kind just mentioned, it is desirable to employ as matrix material a material which in the heat-set product will tolerate prolonged exposure to liquid without losing its cohesiveness.

To produce compacted extrudate that is frozen or chilled or heat-set, the extrusion nozzle can be associated with cooling or heating means.

The invention will now be further described with reference to the accompanying drawings, in which.

Figure 1:
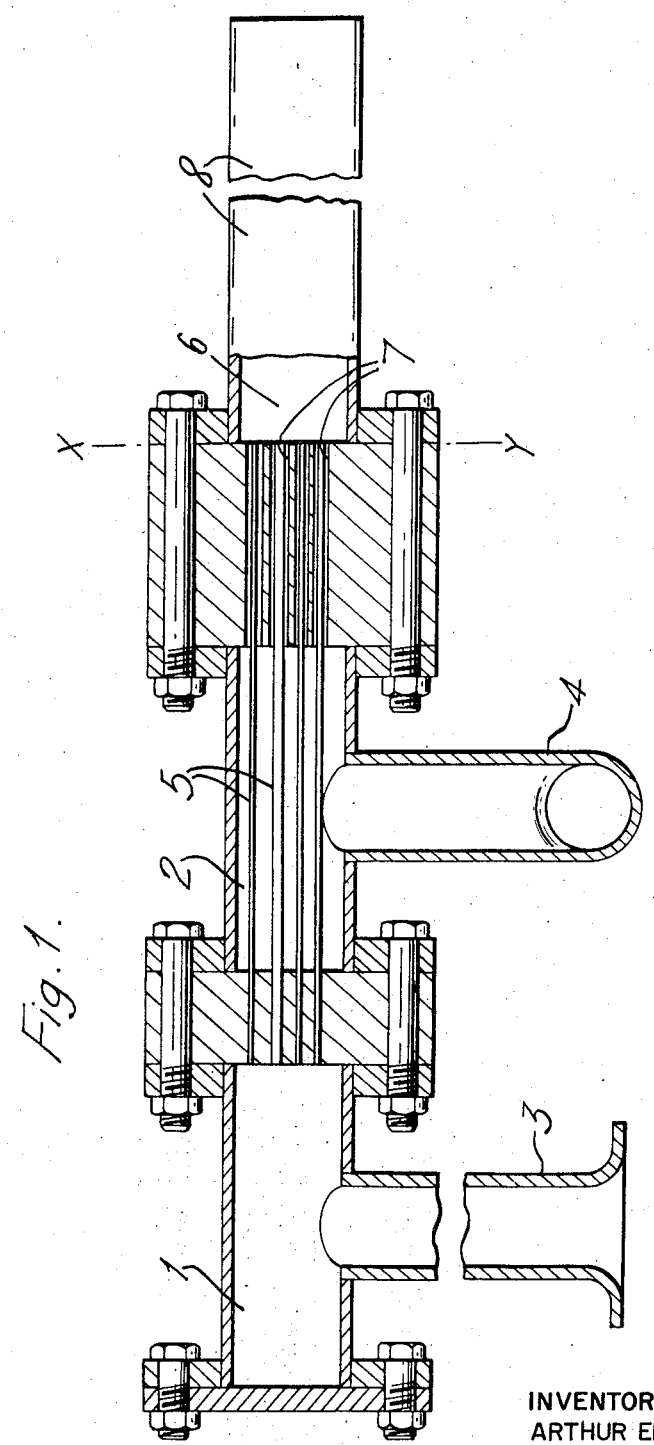
FIG. 1 is a schematic longitudinal section of one form of apparatus for carrying out the process of the invention.

The apparatus shown in FIG. 1 comprises two chambers 1 and 2 to which meat comminute and matrix material respectively can be supplied by feed tubes 3 and 4. Within chamber 2 are tubes 5 (of which, for clarity, only a few are shown) by which meat comminute supplied to chamber 1 can be fed to an extrusion zone 6, to which matrix material can also be fed via annular passages such as 7 surrounding each meat comminute feed tube 5. An elongated compaction nozzle 8 surrounds the extrusion zone 6.

Figure 2:
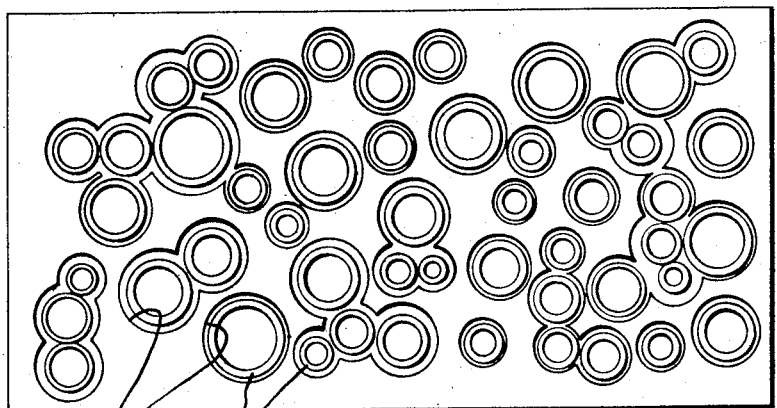
FIG. 2 is a view, in a direction at right angles to that of FIG. 1 and on an enlarged scale, of part of the apparatus.

FIG. 2 shows the disposition of the meat comminute tubes 5 and matrix material annular passages 7 at the extrusion zone 6. The tubes are of various diameters (conveniently from 3.0–4.5 mm.) and are laid out in an irregular pattern. The annular passages are suitably of width 0.25–0.50 mm. measured radially.

In use of the apparatus, fibrous comminute of meat is fed into the chamber 1 and passes thence through the tubes 5, while matrix material is fed into the chamber 2 and passes through the annular passages 7 surrounding the tubes 5. Streams of comminuted meat at least partly coated with matrix material are produced in the extrusion zone 6 and come together to form a coherent structure as they pass through the elongated compaction nozzle 8.

Figure 3:
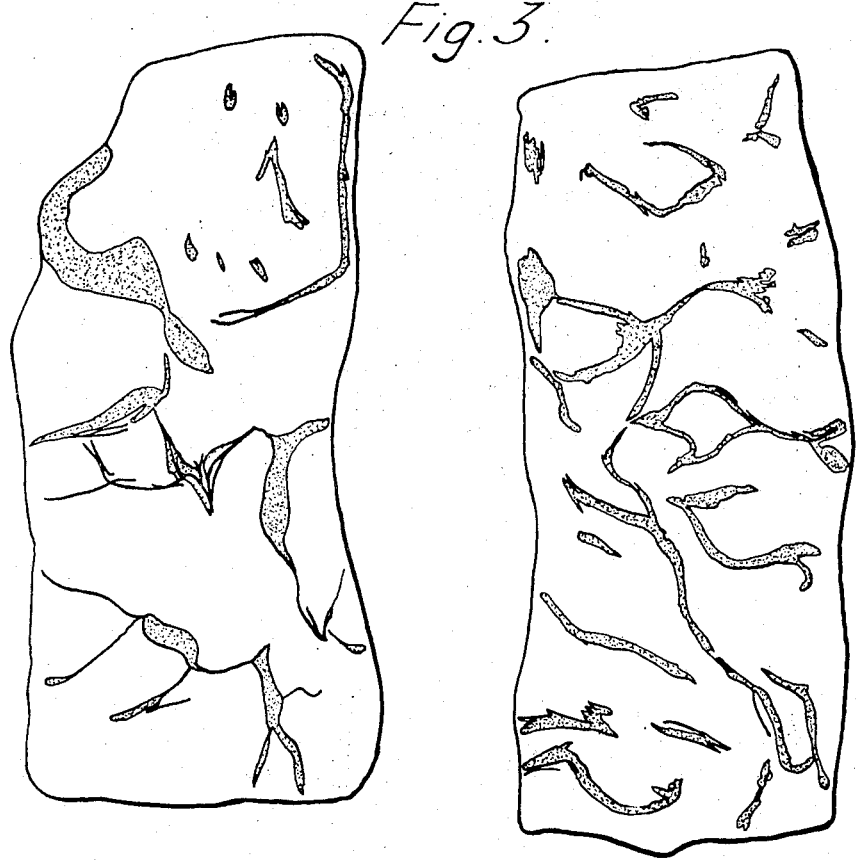
FIG. 3 shows drawings of two forms of product in cross section.

FIG. 3 shows the appearance of two products obtained by cooking and slicing compacted extrudate obtained using the apparatus shown in FIGS. 1 and 2. In the drawings, the matrix material simulating fine connective tissue is represented by black irregular lines, and that simulating somewhat coarser connective tissue, and fat, is represented by shaded areas. The unmarked areas represent regions of the slice in which streams of meat comminute coated with matrix material are packed close together.

The left-hand drawing in FIG. 3 is of a product obtained under somewhat different conditions (in particular, using a rather higher ratio of matrix material: fibrous comminute of meat) from those used to obtain the product shown in the right-hand drawing.

The meat comminute used in preparing the products to which FIG. 3 relates was made thus:

Frozen, boneless forequarter of beef was passed through a mincer plate having holes of diameter 3 mm., and the issuing comminute (temperature not above 10° C.) was mixed with sodium chloride (1% by weight), cooked meat fibre (7.5%) and water (10%).

The meat fibre ingredient had been obtained by cooking cubes (of 4 cm. side) of boneless topside of beef at 120° C. for one hour, and teasing the cooked material for 15 seconds in a bowl chopper with its blade/wall gap set fairly wide (4 mm.).

The matrix material used in preparing the products to which FIG. 3 relates had the composition (by weight): wheat flour, 20%; dried egg albumen, 5%; methyl cellulose, 2%; water, 73%.

In the apparatus (see FIGS. 1 and 2) used to produce the product to which FIG. 3 relates, the outlets of meat comminute tubes 5 and of the annular passages 7 for matrix material are in the same plane, and this coplanarity results in the matrix material being used up partly in coating the extruded streams of meat comminute and partly in forming relatively extensive zones of fat-simulating tissue. If, however, the meat comminute tubes 5 are arranged to terminate sooner (i.e., to the left of line XY in FIG. 1), proportionately more of the matrix material is used in coating the meat comminute streams and less in forming zones that simulate connective tissue and fatty tissue.

Figure 4:
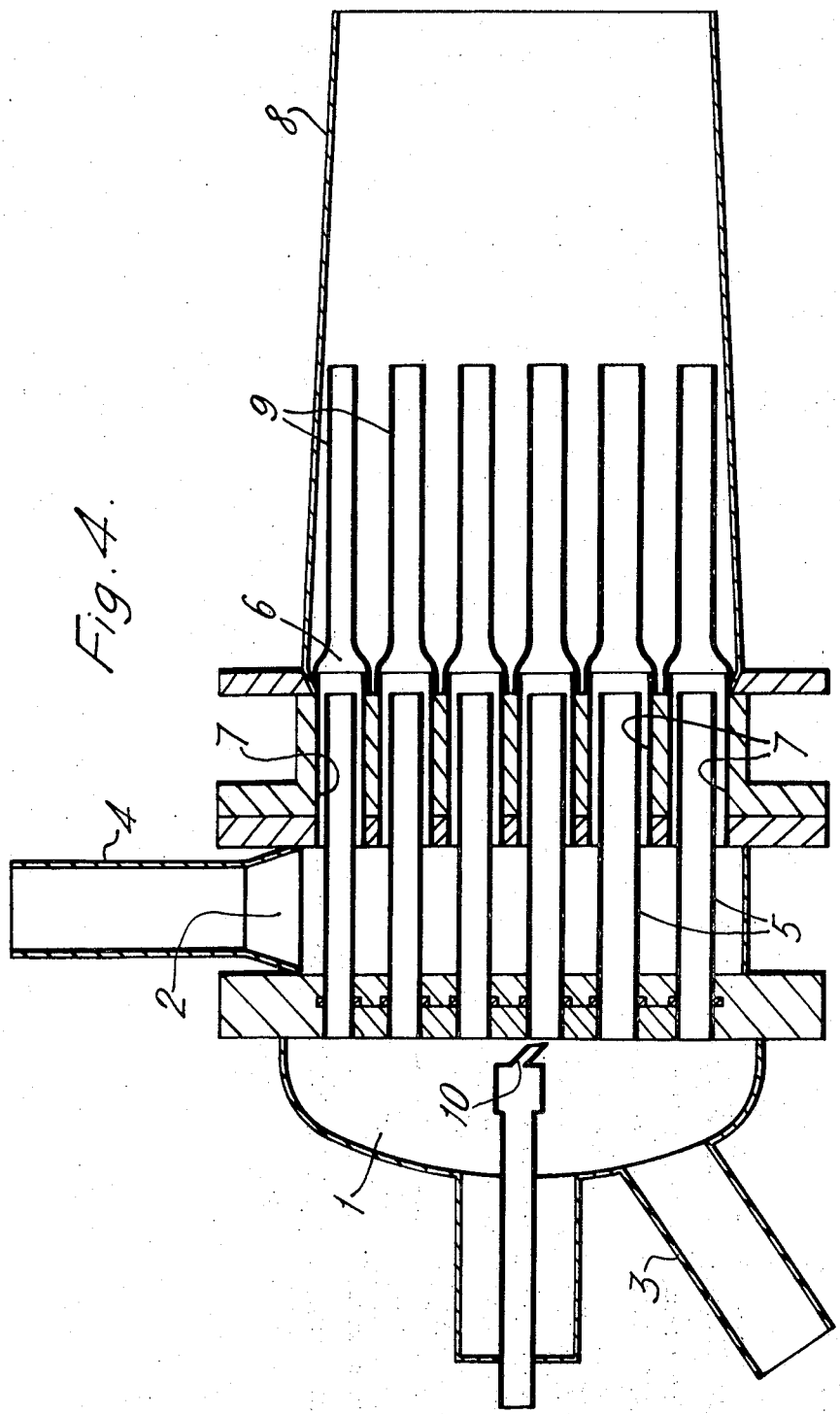
FIG. 4 is a schematic longitudinal section of a second form of apparatus for carrying out the process of the invention.

The apparatus shown in FIG. 4 comprises two chambers 1 and 2 to which meat comminute and matrix material respectively can be supplied by feed tubes 3 and 4 respectively. Within chamber 2 are tubes 5 (of which, for clarity, only a few are shown) by which meat comminute supplied to chamber 1 can be fed to an extrusion zone 6, to which matrix material can also be fed via annular passages such as 7 surrounding each meat comminute feed tube 5.

Secured to the outer wall of each annular passage 7 for matrix material is a tube 9, suitably of thick-walled polyethylene or like resilient material, the tubes 9 collectively being surrounded by a slightly tapering compaction nozzle 8 and terminating about half-way along the nozzle. The outermost tubes 9 are engaged by the inner wall of nozzle 8 (see FIG. 5), and this results in their outlets being distorted through compression. The tubes 9 are at their outlets preferably made with a reduced wall thickness, to permit very close packing of the emerging streams of extrudate.

Blockage of meat comminute tubes 5 (by accumulation at their entrances of meat fibre and fine elongated strands of connective tissue remaining unsevered from the original comminution operation) is prevented by a rotating knife-blade 10.

Suitable dimensions for the meat comminute tubes 5 are: length, 100 mm.; diameter, 12.5 mm. The annular passage 7 is suitably of width 0.25–0.50 mm. measured radially (the width being at the higher value for matrix material of high viscosity).

In use, fibrous comminute of meat, and matrix material, are fed into the apparatus, and streams of meat comminute at least partly coated with matrix material are produced in the extrusion zones 6. They then continue through tubes 9, and emerge close together and with irregular cross-section from the distorted, compressed outlets of those tubes. The streams merge into a coherent structure in passing along the remaining length of nozzle 8.

Figure 5:
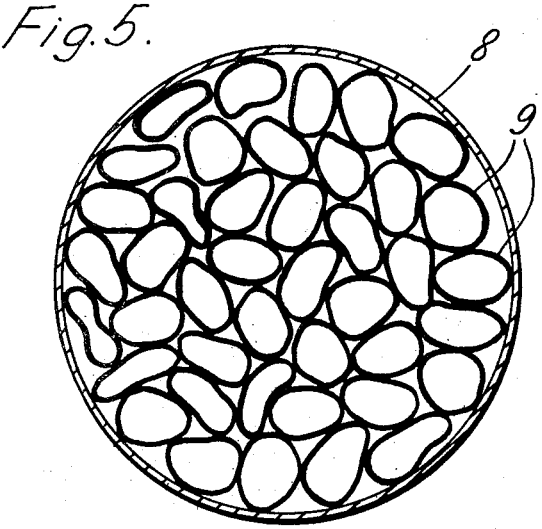
FIG. 5 is a view, in a direction at right angles to that of FIG. 4, of part of the apparatus.
Figure 6:
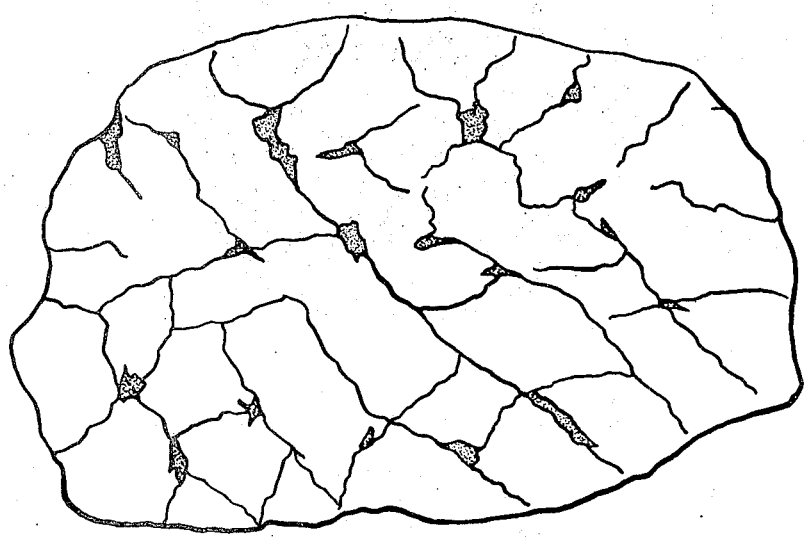
FIG. 6 is a drawing of a form of product in cross section.

The apparatus of FIGS. 4 and 5 was used to investigate the effect, on appearance (after roasting) of the restructured meat, of variations in the relative flow rates of fibrous comminute of meat (from tough forequarter of beef) and matrix material. At a ratio of 10:1 (comminute:matrix material) cut slices of roasted compacted extrudate resembled in appearance slices cut from a joint of natural meat of poor quality, having much connective tissue, although the slices had an acceptable eating texture. At a ratio of 100:1, the slices had the uniform appearance of cooked liver. At ratios from 20:1 to 50:1, the slices were of appetizing appearance, being particularly good at a ratio of 30:1, as illustrated in FIG. 6.

What is claimed is:

1. In a process for preparing a restructured meat product from a meat comminute having a content of fiber and from an edible matrix-forming material, said process comprising extruding said meat comminute under conditions of shear such as to align at least part of the fiber content of the comminute in the direction of extrusion, the improvement which consists in carrying out the steps of:
(a) extruding the meat comminute as multiple parallel streams;
(b) extruding the edible matrix-forming material concurrently with but separately from said multiple streams of meat comminute and in the form of annular streams surrounding said streams of meat comminute, said edible matrix-forming material being one which in the cooked state is noticeably different in color from the meat comminute and is retained therewith, said extrusion providing an extrudate which comprises a matrix of said matrix-forming material in which said meat comminute streams are coated with said matrix-forming material, and
(c) laterally compacting said extrudate, thereby forming a coherent product in which, on cooking, the matrix-forming material simulates in appearance the connective tissue of natural meat.

References Cited
UNITED STATES PATENTS

| | | | |
|---|---|---|---|
| 1,265,853 | 5/1918 | Wiseman | 99—107 X |
| 2,747,522 | 5/1956 | Newland | 99—108 X |
| 3,163,541 | 12/1964 | Mainhardt et al. | 99—108 |
| 3,482,998 | 12/1969 | Carroll et al. | 99—108 |
| 3,622,353 | 11/1971 | Bradshaw et al. | 99—108 X |

HYMAN LORD, Primary Examiner

U.S. Cl. X.R.

426—297, 302